May 7, 1940. U. SCHMIDT 2,199,843
REFLECTING SYSTEM HAVING TWO PLANE REFLECTING SURFACES
Filed March 8, 1938

Inventor:
Ulrich Schmidt

Patented May 7, 1940

2,199,843

UNITED STATES PATENT OFFICE 2,199,843

REFLECTING SYSTEM HAVING TWO PLANE REFLECTING SURFACES

Ulrich Schmidt, Jena, Germany, assignor to the firm of Carl Zeiss, Jena, Germany Application March 8, 1938, Serial No. 194,643
In Germany March 18, 1937

1 Claim. (Cl. 88—1)

An application has been filed in Germany March 18, 1937.

The invention relates to reflecting systems having two plane reflecting surfaces for deviating at right angles a ray pencil which intersects the reflecting surfaces in two straight lines including an angle of 45°. Such reflecting systems have often been used in the form of the known pentagon prisms or of corresponding reflecting squares consisting of two plane mirrors. These prisms or squares have the property to so deviate a ray pencil of this kind whose plane coincides with a principal section and is therefore at right angles to the reflecting surfaces that the ray pencil remains in its plane. Accordingly, if a reflecting system of this kind is used for deviating imaging rays laterally, for instance horizontally, the rays will not be deviated upwardly, i. e. vertically.

Sometimes, however, an imaging ray pencil is desired to be deviated in both the said senses, without a somersaulting of the image, the axial ray of the incident plane pencil coinciding with a principal section having to be parallel to the plane of the reflected ray pencil. The invention refrains from adding to the reflecting system a suitable additional reflecting system deviating in the said other sense and solves the problem by inclining the two reflecting surfaces at inversely equal angles to the plane of the entering pencil. This solution does not prevent the deviation of the pencil in the one sense at right angles and provides that the deviation in the other sense depends on the magnitude of the inclination of the reflecting surfaces. Each of the reflecting surfaces is to be inclined at the fourth part of the desired angle of deviation.

A pentagon prism the reflecting surfaces of which are inclined in the manner described provides an invariable deviation of the incident rays in each of the two senses. If the desired angle of deviation is to be variable in the one of the two senses, use can be made of a reflecting system consisting of two plane mirrors each of which is rotatable about an axis parallel to the reflecting surface and the plane of the incident pencil, the two mirrors being so coupled to each other as to be tiltable relatively to the plane of the pencil through variable angles which are inversely equal.

Figure 1:
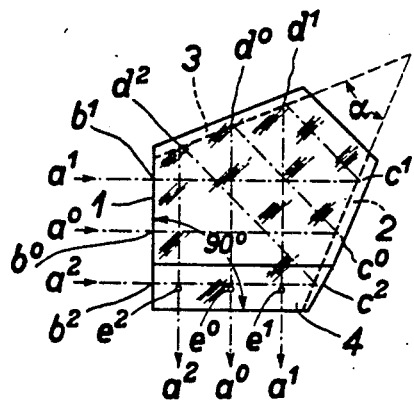
Figure 2:
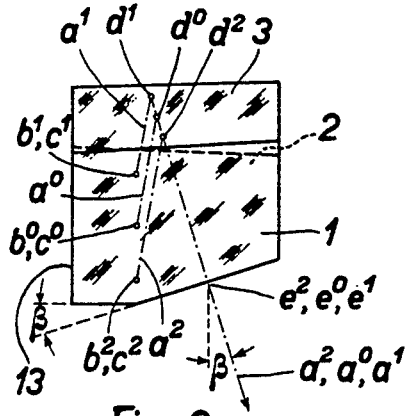

In the accompanying drawing, which illustrates a constructional example of the invention, Figures 1 and 2 show in plan view and in side elevation, respectively, a reflecting system deviating a ray pencil laterally at right angles and providing an invariable altitudinal deviation.

The example shown by Figures 1 and 2 is a pentagon prism whose ray entrance surface 1 is at right angles to the plane in which Figure 1 is represented in the drawing, the entering ray pencil lying in a horizontal plane coinciding with a principal section of the prism which is parallel to the first said plane. The said plane pencil, which is assumed to consist of parallel rays, has an axial ray $a^0$ and two rays $a^1$ and $a^2$ lateral thereto. The two reflecting surfaces 2 and 3 of the prism are arranged in the manner usual with the known pentagon prisms. The edges in which these surfaces 2 and 3 intersect the pentagon surface 13, which is parallel to the plane of the entering pencil, include an angle $\alpha = 45°$. The surfaces 2 and 3 are inclined relatively to a line at right angles to the pentagon surface 13 at inversely equal angles smaller than $22\frac{1}{2}°$. The ray exit surface 4 is at right angles to the entrance surface 1 and inclined to the said line at the desired angle of altitudinal deviation $\beta$, which is four times the angle of inclination of the reflecting surfaces.

The entering rays $a^0$, $a^1$, $a^2$ traverse the entrance surface 1 at points $b^0$, $b^1$ and $b^2$, respectively, which are at the same height above the plane of the drawing, and then strike the reflecting surface 2 respectively at points $c^0$, $c^1$ and $c^2$ also of same height. The rays are subject not only to the lateral deviation at 45° but, on account of the inclination of the surface 2, also to an altitudinal deviation amounting to twice the angle of inclination of this surface, the rays remaining parallel to each other and striking the reflecting surface 3 at points $d^0$, $d^1$ and $d^2$, which are at different heights on account of the different lengths of the paths between the reflecting surfaces 2 and 3. The points $d^0$, $d^1$ and $d^2$ lie in the plane of reflection as well as in two other planes, viz. that of the incident and that of the reflected pencil. The plane of the reflected pencil is at right angles to the ray entrance surface 1 and inclined at the desired angle of altitudinal deviation $\beta$ to the plane of Figure 1 in the drawing, which is due to the rays striking the reflecting surface 3 being deviated upwardly at an angle that is twice the angle of incidence. The ray exit surface 4 is traversed by the reflected rays $a^0$, $a^1$ and $a^2$ at right angles at points $e^0$, $e^1$ and $e^2$, respectively, the incident axial ray $a^0$ being parallel to the plane containing the reflected rays $a^0$, $a^1$, $a^2$.

I claim:

A reflecting system in the form of a pentagonal prism embodying a ray entrance surface, a ray exit surface at right angles to said entrance surface, and two reflecting surfaces intersecting a plane at right angles to said entrance surface in two straight lines including an angle of 45°, said reflecting surfaces being inclined to a line at right angles to said plane at inversely equal angles smaller than 22½°, said exit surface being inclined to said plane at an angle of 90° less four times the angle included between each of said reflecting surfaces and last said line.

ULRICH SCHMIDT.